(12) United States Patent
Zhou et al.

(10) Patent No.: US 9,561,870 B2
(45) Date of Patent: Feb. 7, 2017

(54) CARRIER HAVING NON-ORTHOGONAL AXES

(71) Applicant: SZ DJI TECHNOLOGY CO., LTD., Shenzhen (CN)

(72) Inventors: Li Zhou, Shenzhen (CN); Peng Wang, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 15/024,128

(22) PCT Filed: Dec. 10, 2013

(86) PCT No.: PCT/CN2013/089022
§ 371 (c)(1),
(2) Date: Mar. 23, 2016

(87) PCT Pub. No.: WO2015/085499
PCT Pub. Date: Jun. 18, 2015

(65) Prior Publication Data
US 2016/0229556 A1  Aug. 11, 2016

(51) Int. Cl.
*G03B 39/00* (2006.01)
*B64D 47/08* (2006.01)
(Continued)

(52) U.S. Cl.
CPC ............ *B64D 47/08* (2013.01); *B64C 39/024* (2013.01); *F16M 13/02* (2013.01);
(Continued)

(58) Field of Classification Search
CPC . B64D 47/08; B64C 39/024; B64C 2201/127; F16M 13/02; F16M 2200/06; F16M 2200/041
(Continued)

(56) References Cited

U.S. PATENT DOCUMENTS 5,897,223 A * 4/1999 Tritchew .............. G03B 15/006
  348/144
6,263,160 B1 * 7/2001 Lewis ..................... G03B 15/00
  248/550
(Continued)

FOREIGN PATENT DOCUMENTS

CN 201287830 Y 8/2009
CN 101734377 A 6/2010
(Continued)

OTHER PUBLICATIONS

An Office Action issued by the State Intellectual Property Office of the People's Republic of China for Chinese application No. 2013800276176 The document is dated Aug. 13, 2015.
(Continued)

*Primary Examiner* — Todd M Epps
(74) *Attorney, Agent, or Firm* — Finnegan, Henderson, Farabow, Garrett & Dunner, L.L.P.

(57) ABSTRACT

A carrier for a movable object to couple a carried object to the movable object, wherein the carrier has at least two rotational axes; wherein a combined rotation about the at least two rotational axes controls an orientation of the carried object or compensates a movement and a vibration of the movable object, so as to stabilize the carried object; wherein an angle formed by the two rotational axes is a non-right angle to reduce a rotation radius of the rotation, thereby reducing an equivalent moment of inertia; and wherein a center of gravity of a load applied on each axis of the two rotational axes coincides with a corresponding axis.

10 Claims, 7 Drawing Sheets

(51) Int. Cl.
*B64C 39/02* (2006.01)
*F16M 13/02* (2006.01)

(52) U.S. Cl.
CPC .. *B64C 2201/127* (2013.01); *F16M 2200/041* (2013.01); *F16M 2200/06* (2013.01)

(58) Field of Classification Search
USPC .......................................... 396/13, 419, 428
See application file for complete search history.

(56) References Cited

U.S. PATENT DOCUMENTS

| | | | | |
|---|---|---|---|---|
| 7,955,006 | B1* | 6/2011 | Harvey | F16M 11/10 396/12 |
| 9,348,197 | B2* | 5/2016 | Lewis | G03B 17/561 |
| 2009/0216394 | A1* | 8/2009 | Heppe | B64C 39/024 701/16 |

| | | | |
|---|---|---|---|
| 2014/0037278 | A1 | 2/2014 | Wang |

FOREIGN PATENT DOCUMENTS

| | | |
|---|---|---|
| CN | 101758929 A | 6/2010 |
| CN | 201604802 U | 10/2010 |
| CN | 102353365 A | 2/2012 |
| CN | 202494448 U | 10/2012 |
| CN | 102996983 A | 3/2013 |

OTHER PUBLICATIONS

An Office Action issued by the State Intellectual Property Office of the People's Republic of China for Chinese application No. 2013800276176 The document is dated Jan. 12, 2016.
An International Search Report for PCT/CN2013/089022, dated Sep. 2, 2014.

* cited by examiner

CARRIER HAVING NON-ORTHOGONAL AXES

CROSS REFERENCE TO RELATED APPLICATIONS

This application is a national stage entry of International Application No. PCT/CN2013/089022 filed on Dec. 10, 2013, the entire contents of which are incorporated by reference herein.

TECHNICAL FIELD

The present invention relates to a carrier, and particularly to a carrier for a movable object.

BACKGROUND OF THE INVENTION

An unmanned movable object (e.g., an unmanned aerial vehicle) may have a small size, light weight, low cost, flexible operation and high safety, and can be widely used in such fields as aerial photography, surveillance, search and rescue, resource exploration, and the like. However, since an unmanned movable object (particularly, an unmanned aerial vehicle) may experience high-frequency vibration and low-frequency jitter, a carried object (e.g., a camera) for aerial photography, surveillance, search and resource or resource exploration is usually not directly mounted on the movable object. A stabilizing carrier is needed to carry a video camera, a camera or instruments for performing surveillance or search and rescue tasks. The carrier device for carrying the camera or relevant apparatus is referred to as a "gimbal".

SUMMARY OF THE INVENTION

The present invention provides a carrier for a movable object to couple the movable object and a carried object, wherein the carrier may rotate along at least two rotational axes; wherein a combined rotation about the at least two rotational axes may control an orientation of the carried object or compensate a movement and a vibration of the movable object, so as to stabilize the carried object; wherein an angle formed by the two rotational axes may be a non-right angle to reduce a rotation radius corresponding to the rotation, so as to reduce a corresponding moment of inertia; and wherein a center of gravity of a load applied on each axis of the two rotational axes coincides with a corresponding axis.

In some embodiments, the carrier may comprise three rotational axes; wherein a combined rotation about the three rotational axes may control the orientation of the carried object or compensate the movement and vibration of the movable object, so as to stabilize the carried object; wherein at least one angle formed by two axes among the three rotational axes may be a non-right angle; and wherein a center of gravity of a load applied on each axis of the three rotational axes coincides with a corresponding axis.

In some embodiments, the non-right angle may be greater than 0° but less than 90°. In some embodiments, the non-right angle may be between 60° and 70°. In some embodiments, the non-right angle may be about 70°.

In some embodiments, the non-right angle may be formed by bending a lateral shaft arm towards a horizontal plane.

In some embodiments, the carrier may be a carrier for carrying imaging equipment on a remotely controlled aerial vehicle.

In some embodiments, the carrier may further comprise a frame assembly, a transmission assembly and a carried object assembly, wherein the frame assembly may comprise three frames (a first frame, a second frame and a third frame).

In some embodiments, the carrier may be a dynamic self-balancing gyroscopic carrier. The carrier may further comprise a control assembly comprising an inertial sensor configured to detect an attitude information of the carried object, and a processor configured to control the attitude of the carried object based upon the attitude information.

In some embodiments, the transmission assembly may further comprise a motor assembly controlled by the processor based upon the attitude information, wherein the motor assembly may directly drive the frame assembly to rotate the frame assembly with respect to the carried object, so as to adjust the attitude of the carried object.

In some embodiments, the carrier may further comprise a horizontal rotating frame connected to the first frame and the second frame, and the horizontal rotating frame may be mounted with a cross connection mechanism and a mechanical gyroscope therein.

In some embodiments, the transmission assembly may comprise a motor, wherein the motor may directly drive the first frame to rotate the first frame with respect to the second frame.

In some embodiments, the transmission assembly may comprise a first motor and a second motor, wherein the first motor may directly drive the first frame to rotate the first frame with respect to the second frame, and the second motor may directly drive the linkage member, so as to drive the second frame to rotate with respect to the third frame.

In some embodiments, the carrier may further comprise electronic speed regulation modules and casings, the number of the electronic speed regulation modules and the casings corresponds to the number of the motors; each of the motors may be electrically connected to a corresponding electronic speed regulation module, and the motor and the corresponding electronic speed regulation module being received in one casing.

In some embodiments, an electric slip ring can be disposed between a motor assembly and a frame, such that a frame can rotate 360° circumferentially about the corresponding rotation axis.

In some embodiments, an electric slip ring may be disposed between the first motor and the first frame, and an electric slip ring may be disposed between the second motor and the second frame, such that the first frame and the second frame may each rotate 360° circumferentially about a corresponding rotation axis.

The present invention further provides a carrier for a movable object, comprising a frame assembly (a first frame and a second frame), a motor assembly (a first motor and a second motor), an imaging device and a control assembly; the control assembly may comprise an inertial sensor for detecting an attitude information of the imaging device, and a processor for controlling the motor assembly based upon the attitude information; the motor assembly may directly drive the frame assembly to rotate so as to adjust an imaging angle of the imaging device; the first frame and the second frame may respectively rotate about a fixed axis (e.g., rotational axis Z and rotational axis Y), wherein an angle formed by the rotational axis Z and rotational axis Y may be a non-right angle.

In some embodiments, an angle formed by the rotational axis Y and rotational axis Z may be between 60° and 70°. In some embodiments, the angle formed by the rotational axis Y and rotational axis Z may be about 70°. In some embodiments, the angle formed by the rotational axis Y and rotational axis Z may be between 0° and 90°.

The present invention further provides a carrier for a movable object, comprising a stabilizing device, a transmission device and an imaging device, wherein the imaging device may comprise a horizontal rotating frame connected to a frame assembly I and a frame assembly II. The horizontal rotating frame may be mounted with a cross connection mechanism and a mechanical gyroscope therein, wherein the cross connection mechanism may comprise an inner frame and an outer frame, and the mechanical gyroscope may be fixed on the inner frame. The transmission device may comprise a transmission rod I and a transmission rod II which are fixed on a side shaft of the outer frame; and the imaging device may comprise a U-shaped suspension frame and a camera frame fixed on the U-shaped suspension frame, wherein the U-shaped suspension frame may be connected non-perpendicularly to the horizontal rotating frame.

In some embodiments, an angle at which the horizontal rotating frame is connected to the U-shaped suspension frame may be between 30° and 45°. In some embodiments, the angle at which the horizontal rotating frame is connected to the U-shaped suspension frame may be between 0° and 30°. In some embodiments, the angle at which the horizontal rotating frame is connected to the U-shaped suspension frame may be between 45° and 90°.

The present invention further provides a carrier for a movable object, comprising a frame assembly, a transmission assembly and an imaging assembly. The frame assembly may comprise a first frame, a second frame and a third frame; the imaging assembly may be fixed on the first frame. The first frame may be rotatably connected with the second frame, and the second frame may be rotatably connected with the third frame. The transmission assembly may comprise a first motor and a second motor, the first motor may directly drive the first frame to rotate with respect to the second frame, and the second motor may directly drive the second frame to rotate with respect to the third frame. At least one angle formed by two rotational axes among the rotational axis of the first frame, the rotational axis of the second frame and the rotational axis of the third frame (referred to as X axis, Y axis and Z axis, respectively) may be a non-right angle.

In some embodiments, the angle formed by the two rotational axes may be between 30° and 45°. In some embodiments, the angle formed by the two rotational axes may be between 0° and 30°. In some embodiments, the angle formed by the two rotational axes may be between 45° and 90°.

In some embodiments, the carrier may further comprise a connecting plate, both the motor and the electronic speed regulation module may be fixedly connected to the connecting plate. The motor may be disposed in proximity to the electronic speed regulation module. The casing may be provided with a hole at a position corresponding to an upper end of the motor; and the casing may be provided with a notch at a position corresponding to an outer circumferential side of the motor. The casing may be fixed to the connecting plate. An encoder, which is received in the casing, may be fixedly connected to the connecting plate.

The present invention further provides a carrier of a movable object, comprising a first frame, a second frame and a carrying element for carrying a carried object, wherein the carrying element may be rotatably connected to the first frame, and the first frame may be rotatably connected to the second frame. The carrier may further comprise a first driving member for driving the carrying element to rotate with respect to the first frame, and a second driving member for driving the first frame to rotate with respect to the second frame. The first driving member may comprise a first motor, and the second driving member may comprise a second motor. A first electric slip ring may be disposed between the carrying element and the first frame, which may maintain an electrical conductivity when the carrying element rotates; and a second electric slip ring may be disposed between the first frame and the second frame, which may maintain an electrical conductivity when the first frame rotates. The first electric slip ring may be electrically conductive with the second electric slip ring. The rotational axis of the carrying element rotating with respect to the first frame and the axis of the first frame rotating with respect to the second frame may be referred to as rotational axis X and rotational axis Y, respectively, and an angle formed by the rotational axis X and rotational axis Y may be a non-right angle.

In some embodiments, the angle formed by the rotational axis X and rotational axis Y may be between 30° and 45°. In some embodiments, the angle formed by the rotational axis X and rotational axis Y may be between 0° and 30°. In some embodiments, the angle formed by the rotational axis X and rotational axis Y may be between 45° and 90°.

In some embodiments, the carrier may further comprise a fixing member which can be fixedly locked to the movable object. The second frame may be rotatably connected to the fixing member, and the fixing member may be provided with a third driving member for driving the second frame to rotate with respect to the fixing member. The third driving member may comprise a third motor, and a third electric slip ring may be disposed between the fixing member and the second frame, which maintain an electrical conductivity when the second frame rotates. The rotational axis of the second frame rotating with respect to the fixing member may be referred to as a rotational axis Z, and at least one angle formed by two axes among the X axis, Y axis and Z axis may be a non-right angle.

In some embodiments, the at least one angle formed by two rotational axes may be between 60° and 70°. In some embodiments, the at least one angle formed by two rotational axes may be about 70°. In some embodiments, the at least one angle formed by two rotational axes may be between 0° and 90°.

DETAILED DESCRIPTION OF THE INVENTION

Since a movable object (particularly, an unmanned aerial vehicle) may experience high-frequency vibration and low-frequency jitter, a carried object (e.g., a camera) for aerial photography, surveillance, search and resource and resource exploration is usually not directly mounted on the movable object, and a stabilizing carrier is needed to carry a video camera, an image camera or instruments for performing surveillance or search and rescue. Particularly, the stabilizing carrier may be capable of eliminating an influence on aerial images from high-frequency and low-frequency vibration of the aerial vehicle and avoiding a problem of tiled images caused by the tilting of a aerial vehicle body, so as to guarantee clear and stable images. With the stabilizing carrier, satisfactory results may be achieved in such applications as power line inspection, fixed-point surveillance and aerial photography without performing additional jitter-removing processing.

In addition, if an imaging angle of the camera or other devices is fixed, an application thereof may be significantly limited. A carrier having multiple degrees of freedom may be employed to couple the camera or other devices (e.g., a light source) with a movable object (e.g., an aerial vehicle). The carrier having multiple degrees of freedom may achieve an orientation of the carried object or a compensation of motion and vibration of the movable object, so as to stabilize the carried object.

An object may typically have six degrees of freedom, including translations in three directions and rotations about three rotational axes. The three rotational axes may be referred to as X axis, Y axis and Z axis. In the field of aviation, rotations about the three axes may respectively be referred to as pitch, roll and yaw; therefore, the three axes mentioned above may be referred to as a pitch axis, a roll axis and a yaw axis. The carrier on an aerial vehicle may be a three-axis vehicle, a two-axis vehicle or an one-axis vehicle, i.e., the carrier may respectively have degree(s) of freedom of rotation in three, two or one direction with respect to the aerial vehicle.

The carrier of the present invention may be used in a movable object. The carrier may carry a carried object to achieve a fixing of the carried object with respect to the movable object, an adjusting of an attitude of the carried object (e.g., varying a height, an inclination and/or a direction of the carried object), and a stable posture of the carried object at a certain attitude. For instance, the carrier may comprise a gimbal having a stabilization functionality. The carrier may serve as an auxiliary device for photographing, video shooting, surveillance (radar), sampling and illuminating, and may be applied to the fields of air-based vehicles (e.g., a rotor wing or a fixed wing aerial vehicle), water-based vehicles (e.g., a submarine or a ship), road-based vehicles (e.g., a motor vehicle) or space-based vehicles (e.g., a satellite, a space station, or a spaceship). The carried object may be an imaging device such as a camera or a video camera. Alternatively, the carried object may be a sensor, a radar, a light source or other devices.

In some embodiments, advantageous effects of the present invention may be explained by taking a camera as an example of the carried object and taking an aerial vehicle as an example of the movable object. It may be apparent that the carried object can be other types of devices, such as a surveillance camera, a light source and the like, as discussed hereinabove. The movable object may be a submarine or a ship, a motor vehicle, a satellite, a space station or a spaceship and the like.

Figure 1:
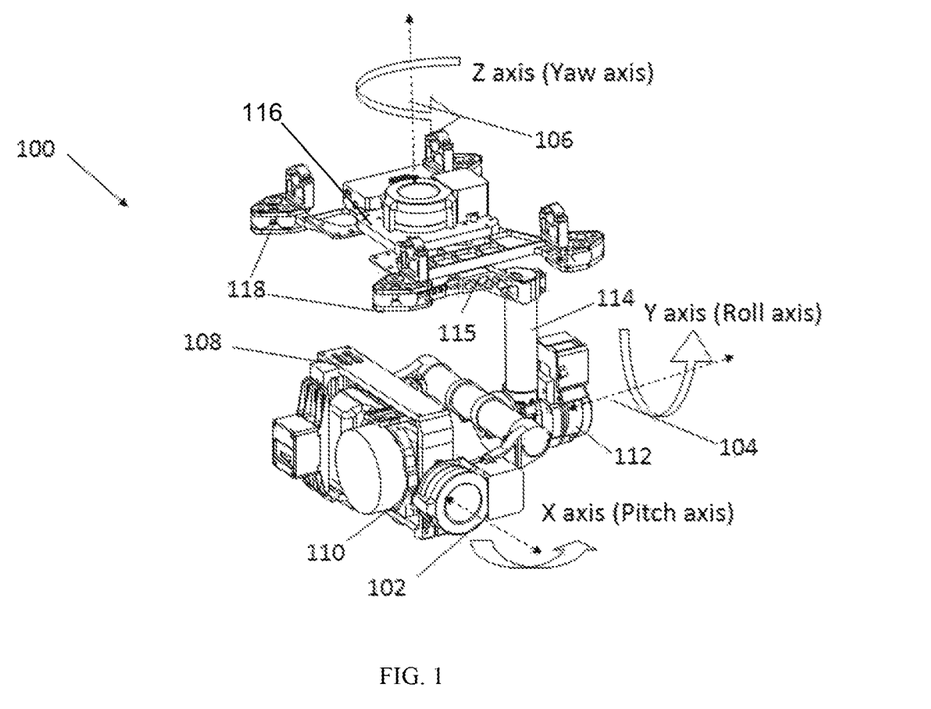
FIG. 1 is a perspective view of an orthogonal carrier.

FIG. 1 is a perspective view of a carrier 100 having three orthogonal axes. The carrier 100 may have a first rotational axis 102 (i.e., X axis or pitch axis), a second rotational axis 104 (i.e., Y axis or roll axis), and a third rotational axis 106 (i.e., Z axis or yaw axis). The three rotational axes 102, 104 and 106 may be orthogonal to one another, in other words, they are angled at 90° with respect to each other.

A first frame 108 may carry one or more carried object(s) (not shown) such as a camera, a light source and the like, and may be driven by a first motor 110 to rotate about the first rotational axis 102 to change a pitch angle of the carried object.

The frame 108, the carried object and the first rotational axis 102 may be driven by a second motor 112 to rotate about the second rotational axis 104 to change a roll angle of the carried object.

The above assemblies may be rotatably connected with a fixing member 116 via a first shaft arm 114 and a second shaft arm 115. The fixing member 116 may be fixed on a movable object (not shown) via a plurality of fixing points 118. The assemblies below the fixing member 116, including the first shaft arm 114 and second shaft arm 115, may rotate about the third rotational axis 106 to change a yaw angle of the carried object. It should be noted that the second shaft arm 115 is within the X-Y plane, that is to say, being orthogonal to the Z axis. The second shaft arm 115 may have a bending within the X-Y plane as shown in FIG. 1, but the bending may not be necessary.

Figure 2:
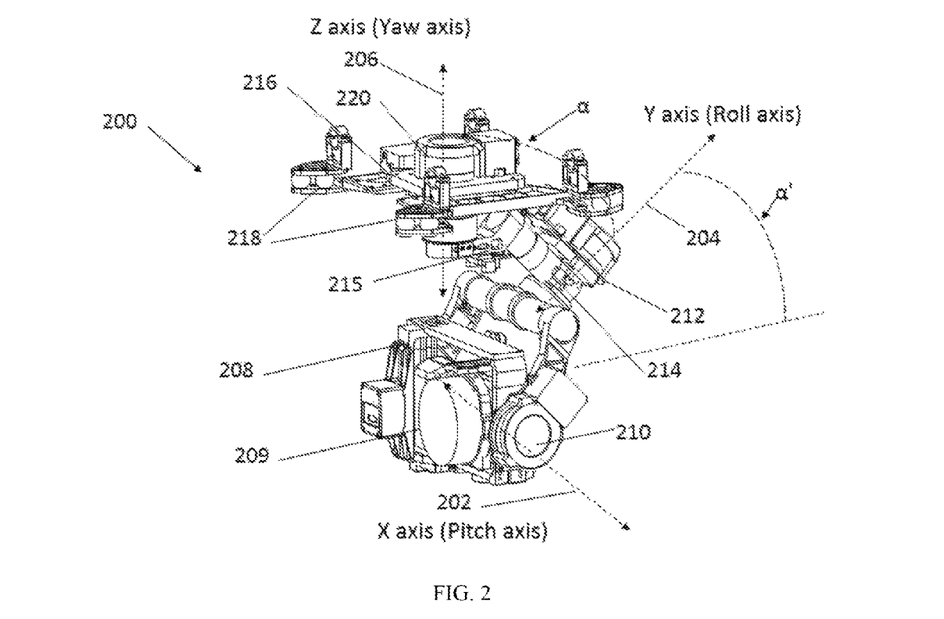
FIG. 2 is a perspective view of a non-orthogonal carrier.

FIG. 2 is a perspective view of a carrier 200 having non-orthogonal axes. In addition to an elimination of high-frequency and low-frequency vibrations of the aerial vehicle, the carrier 200 can rotate about one axis, two axes or three axes to implement better imaging, monitoring or other purposes.

The carrier 200 may have a first rotational axis 202 (i.e., X axis or pitch axis), a second rotational axis 204 (i.e., Y axis or roll axis), and a third rotational axis 206 (i.e., Z axis or yaw axis). The rotational axes 204 and 206 may not be orthogonal to each other. An angle $\alpha$ formed by the rotational axes 204 and 206 may be less than 90°. In some embodiments, the angle $\alpha$ may be about 60° to 70°. In the embodiment as shown in FIG. 2, the angle $\alpha$ may be about 70°. With respect to the carrier shown in FIG. 1, the non-orthogonal Y axis (with respect to the original orthogonal Y axis) may be considered as bending towards the Z axis by $\alpha'=90°-\alpha$, e.g., 20°. Here, $\alpha'$ may be a complementary angle of $\alpha$.

It should be noted that, when an existing multi-axis aerial vehicle performs a tilted flight, an inclined angle in the field of view of a gimbal camera may be corrected by a rolling of the aerial vehicle. Assuming that a maximum angle of tilted flight of the aerial vehicle is 45°, $\alpha'$ may be less than the maximum angle, e.g., 45°, to facilitate a control of the carrier.

Furthermore, an important consideration in designing the mechanical structure of non-orthogonal axes is to reduce a length of the shaft arm and enhance a structural rigidity. In some embodiments, the shaft arm may have the shortest length and the optimal rigidity when α' is in a range of 20° to 45°, while a center of gravity of a load applied on an individual axis coincides with the axis.

A first frame 208 may carry one or more carried objects such as a camera 209, a light source and the like. The first frame 208 may be driven by a first motor 210 to rotate about the first rotational axis 202 and change a pitch angle of the carried object.

The frame 208, the carried object 209 and the first rotational axis 202 may be driven together by a second motor 212 to rotate about the second rotational axis 204 and change a roll angle of the carried object.

The above assemblies may be rotatably connected to a fixing member 216 via a first shaft arm 214 and a second shaft arm 215. The fixing member 216 may be fixed on a movable object (not shown) via a plurality of fixing points 218. The assemblies positioned below the fixing member 216, including the first shaft arm 214 and the second shaft arm 215, may rotate about the third rotational axis 206 to change a yaw angle of the carried object.

It should be noted that, the second shaft arm 215 may deviate from the original X-Y plane; that is to say, the second shaft arm 215 may not be orthogonal to the Z axis. As shown in FIG. 2, the second shaft arm 215 may have a bending in the X-Y plane with a bending angle of 180° Those skilled in the art may appreciate that the non-orthogonal axes may also be implemented by other mechanical structures.

The yaw axis 206 and the roll axis 204, among the three rotational axes of the carrier 200 having non-orthogonal axes shown in FIG. 2, may be non-orthogonal to each other. In this configuration, a motor 220 on the yaw axis 206 and a motor 212 on the roll axis 204 may be provided on proximity to each other, such that the shaft arm 214 may be shorter as compared to the shaft arm 114 shown in FIG. 1, with a more compact structure, better rigidity and less weight. Meanwhile, a load applied on the motor 220 may be reduced. In contrast, the shaft arm 114 shown in FIG. 1 may be longer, leading to an inferior overall rigidity of the carrier. In addition, more material may be needed at a connecting portion of the shaft arm 114, thereby increasing a weight of the carrier 100.

As compared with the carrier 100 shown in FIG. 1, the non-orthogonal yaw axis 206 and the roll axis 204 of the carrier 200 shown in FIG. 2 may also reduce a load rotating space for a rotation of the load (and consequently, the equivalent moment of inertia) when the load rotates about the yaw axis 206, thereby reducing a load applied on the motor 220 of the yaw axis 206.

A center of gravity of a mass block (also referred to as a load) applied on each axis of the carrier 200 in FIG. 2 may coincide with the axis. For instance, the center of gravity of the load applied on the yaw axis 206, including the first shaft arm 214, the second shaft arm 215, the second motor 212, the frame 208, the carried object 209 and the first motor 202 etc., may coincide with the yaw axis 206. When the load rotates about the yaw axis 206, the rotation will be a symmetrical rotation, causing no vibration or associated pressure onto the yaw axis 206. Meanwhile, a vibration transferred from the movable object (e.g., an aerial vehicle or a vehicle) on which the carrier is provided to a carried apparatus (e.g., the carried object 209 such as a camera, a radar or a light source) on the carrier 200 may be removed by an inertia of the load, thereby improving an imaging effect.

The carrier 200 for movable object of present invention may couple the carried object 209 to the movable object. A combined rotation of the carrier about multiple rotation axes may control a orientation of the carried object 209 or compensate a movement and a vibration of the movable object, so as to stabilize the carried object 209. At least one angle formed by two axes among the rotational axes may not be a right angle. The center of gravity of the load applied on the yaw axis 206 may coincide with the yaw axis 206, the center of gravity of the load (e.g., the second motor 212, the frame 208, the carried object 209 and the first motor 202) applied on the roll axis 204 may coincide with the roll axis 204, and the center of gravity of the load (e.g., the frame 208, the carried object 209, and the first motor 202) applied on the pitch axis 202 may coincide with the pitch axis 202.

In some embodiments, the non-right angle may be $0°<α'<90°$ or $90°<(180°-α)<180°$. For instance, α' may be between 0° and 45°. In some embodiments, α' may be between 0° and 30° or between 30° and 45°. In a preferred embodiment, α' may be about 20°. In another preferred embodiment, α' may be about 30°. In some embodiments, α' may be between 45° and 90°.

In some other embodiments, the carrier may comprise only two rotational axes, and an angle formed by the two rotational axes may not be a right angle.

Figure 3A:
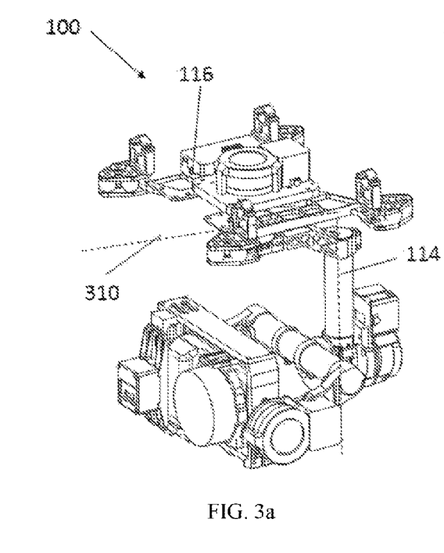
FIGS. 3*a* and 3*b* are schematic views showing an orthogonal carrier and a non-orthogonal carrier, respectively.
Figure 3B:
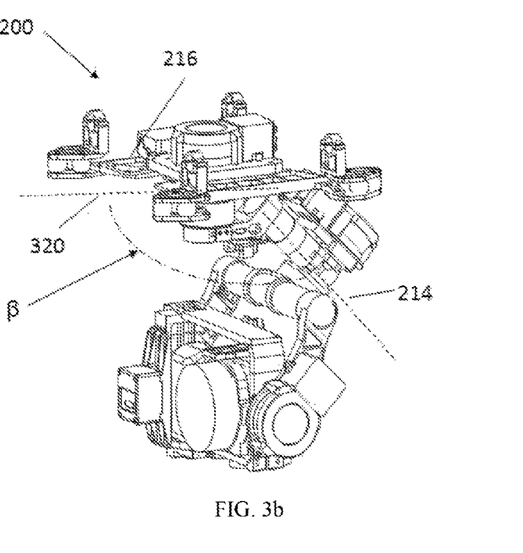

A comparison between the orthogonal carrier 100 and the non-orthogonal carrier 200 is shown further FIGS. 3a and 3b, It should be noted that the fixing members 116 and 216 may respectively define a horizontal plane 310 and a horizontal plane 320. The horizontal plane 310 and a horizontal plane 320 may correspond to an attitude of the aerial vehicle in a horizontal flight. In the orthogonal carrier 100, a direction of the longitudinal shaft arm 114 may be orthogonal to, La, at right angle to the horizontal plane 310. In the non-orthogonal carrier 200, a direction of the longitudinal shaft arm 214 may not be orthogonal to, i.e., at a non-right angle β to the horizontal plane 320, wherein $β=90°+α'$.

It may be apparent from FIG. 3b that, the non-orthogonal yaw axis and roll axis may result in a configuration in which the motor on the yaw axis and the motor on the roll axis may be close to each other, such that the shaft arm 214 between the yaw axis and roll axis may be shorter. The structure of the carrier may be compact, with less r material consumption and reduced weight, thereby reducing the load applied on the motor on the yaw axis.

Figures 4A, 4B:
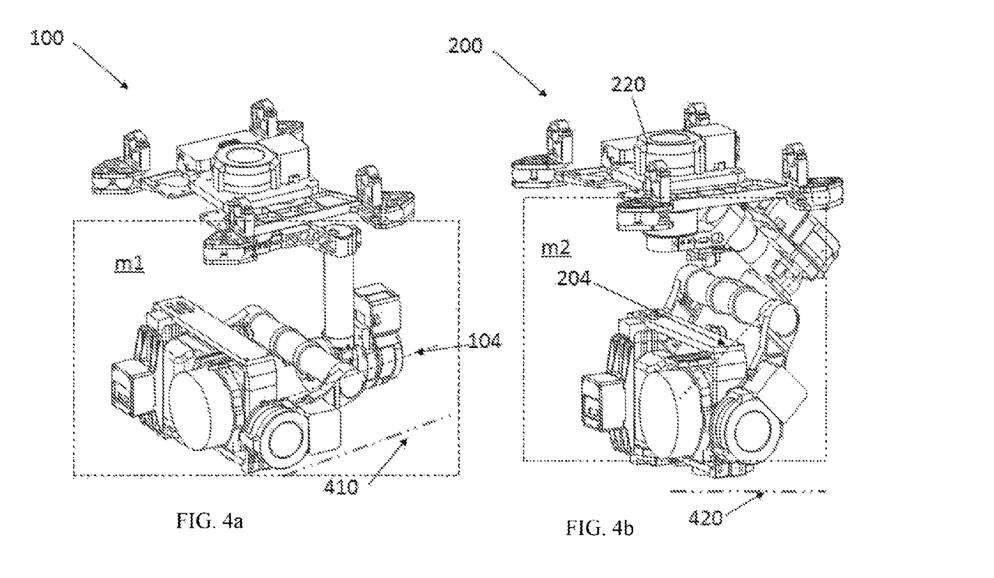
FIGS. 4*a* and 4*b* are schematic view showing an orthogonal carrier and a non-orthogonal carrier, respectively.

A comparison between the orthogonal carrier 100 and the non-orthogonal carrier 200 is shown further in FIGS. 4a and 4b, It may be apparent from FIG. 4b that, the space for a rotation of the non-orthogonal carrier may be smaller. In FIGS. 4a and 4b, a rotation radius of the carrier rotating about the yaw axis may be represented by dash lines 410 and 420 respectively. It can be seen that, when a right angle intersection of the yaw axis and roll axis in the orthogonal carrier 100 is changed to a non-right angle intersection in the non-orthogonal carrier 200, the rotation radius 420 of the yaw axis (namely, the horizontal projection distance between the yaw axis motor and the roll axis motor) may be shorter as compared to the rotation radius 410, such that the non-orthogonal yaw axis and roll axis may reduce the space for the load rotating about the yaw axis (i.e., the equivalent moment of inertia), thereby reducing the load applied on the motor 220 of the yaw axis.

More specifically, for yaw axes 104 and 204 having the same length L, the rotation radii 410 and 420 corresponding to effective rotational mass m1, m2 within the dash-line boxes of FIGS. 4a and 4b may be L and L sin α, respectively. If the rotational mass m1=m2, the rotatory inertia may be proportional to $(\sin α)^2$, and the load applied on the yaw axis motor 220 may be reduced to $(\sin α)^2$ of the original load.

In addition, an operator may control a direction and an angle of a camera or other carried objects more quickly and effectively if the size and weight of the carrier carried on the movable object (particularly, a small unmanned aerial vehicle) is smaller, to thereby achieve better aerial photography and surveillance result. Here, a size of the carrier may not necessarily refer to an overall geometric volume of the carrier. Since a function of the carrier is to rotate about one axis, two axes or three axes, the space for rotating the carrier about a certain axis may reflect an actual "operational" size of the carrier in a more direct way. That is to say, the actual "operational" size of the carrier about an axis may be smaller if a rotating radius of the carrier rotating about the axis is smaller. In addition to a size, a lighter weight of the carrier may reduce the load applied on a driving motor, which facilitates the design of the motor and carrier. In addition to the size and weight, a rigidity of the carrier may be an important factor, like in many mechanical structures. Rigidity is a property that an object resists a deformation in response to an applied force, or the capability of the object in resisting a deformation. It may be understood that the carrier with a higher rigidity may have a longer service life and higher reliability, and also exhibit a rapid response to operations.

Figure 5:
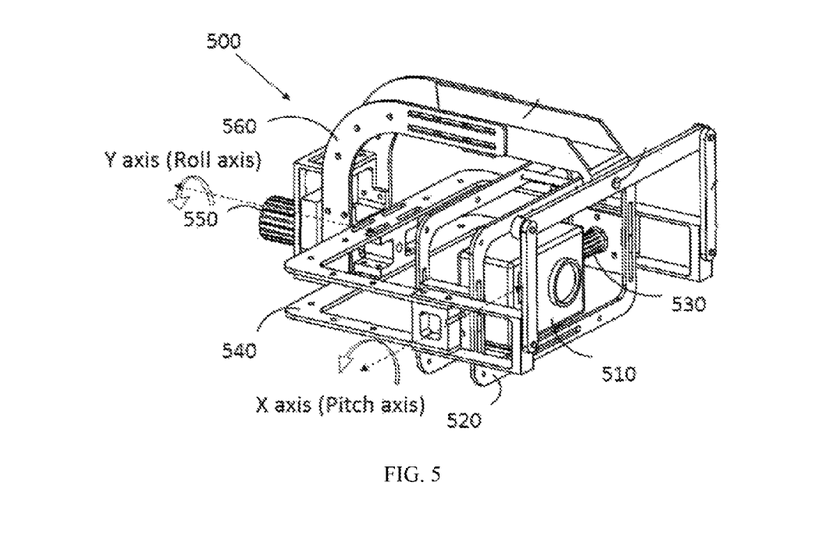
FIG. 5 is a diagram showing structure of a dynamic self-balancing gyroscopic carrier.

The concept of above-discussed carrier having non-orthogonal axes may be applied to various carriers, and may be used to improve the structure of existing carriers. For instance, FIG. 5 is a diagram showing a structure of a two-axis dynamic self-balancing gyroscopic carrier 500. The carrier 500 may comprise a frame assembly, a motor assembly, a control assembly and a carried object 510. The frame assembly may comprise a first frame 520, a second frame 540 and a third frame 560. The carried object 510 may be fixed on the first frame 520. The first frame 520 and the second frame 540 may be provided rotatable with respect to each other (i.e., they can be rotatably coupled to each other). The second frame 540 and the third frame 560 may be provided rotatable with respect to each other (i.e., they can be rotatably coupled to each other). Here, the shape of the carried object 510 may not be limited to a square as shown in FIG. 1. In some embodiments, the shape of the carried object 510 may be circular, oval or other shapes. The carried object 510 may not be limited to the image apparatus as shown in FIG. 5. In some embodiments, the carried object 510 may be an apparatus such as a light source or a radar.

In some embodiments of the present invention, one or more motors may be employed as transmission devices of the carrier. A direct coupling of a motor to power to the frame assemblies of the carrier may consume less energy and save electrical power. Meanwhile, an infinitely variable adjustment may be possible using the motor, with a short response time, a quick start/stop and a timely adjustment of the rotational speed. Therefore, various flight attitudes of an unmanned aerial vehicle may be adopted, and an imaging stability of the imaging assembly may be improved. In some embodiments, rotation of a video camera or image camera about one axis, two axes or three axes may be achieved through a mechanical gear driving manner.

The motor assembly may comprise a first motor 530 and a second motor 550. The first motor 530 may directly drive the first frame 520 to rotate about its rotational axis with respect to the second frame 540. The second motor 550 may directly drive the second frame 540 to rotate about its rotational axis with respect to the third frame 560.

The first frame 520 and the second frame 540 may respectively rotate about a fixed axis (known as rotational axis X and rotational axis Y). In some embodiments, an angle formed by the rotational axis X and rotational axis Y may be a non-right angle. For instance, the conventional right angle between the rotational axis X and rotational axis Y may be reduced. In one configuration of the present invention, a distance between the motor of X axis and the motor of Y axis may be reduced, such that a shorter shaft arm having more compact structure, better rigidity and lighter weight may be obtained. Furthermore, the non-orthogonal X axis and Y axis may reduce the space for the load rotating about the yaw axis (i.e., the equivalent moment of inertia), thereby reducing the load applied on the motor.

In some embodiments, the non-right angle formed by the rotational axis X and rotational axis Y may be between 0° and 90°. In some embodiments, the angle formed by the rotational axis X and rotational axis Y may be between 0° and 30°. In some embodiments, the angle formed by the rotational axis X and rotational axis Y may be between 30° and 45°, for instances, 30° or 45°. In some embodiments, the angle formed by the rotational axis X and rotational axis Y may be between 45° and 90°. In some embodiments, the non-right angle formed by the rotational axis X and rotational axis Y may be between 90° and 180°.

In some embodiments, the carrier is a dynamic self-balancing gyroscopic carrier. The carrier 500 may further comprise a control assembly which may comprise a processor and an inertial sensor. The inertial sensor may detect an attitude information of the carried object 510. The processor may control the motor assembly based upon the attitude information. The motor assembly may directly drive the frame assembly to rotate with respect to the carried object, thereby adjusting the attitude of the carried object 510.

In some embodiments, the carrier 500 may further comprise a horizontal rotating frame connected to the first frame and second frame. The horizontal rotating frame may be mounted with a cross connection mechanism and a mechanical gyroscope therein. The stability of the carrier as discussed hereinabove may be implemented by the gyroscope. The gyroscope may comprise a rotatable wheel located at an axis of the gyroscope. The gyroscope may be capable of achieving a self-stability because once the gyroscope begins to rotate, it has a tendency of resisting a change in direction due to the angular momentum of the wheel.

Therefore, a mechanical stabilizing gyroscope having a large inertia may be employed to stabilize the carrier. The horizontal rotating frame may be connected to the frames of the carrier, and the mechanical gyroscope may be connected on the horizontal rotating frame to form a stabilizing device. The stabilizing device may be connected with the imaging device via the transmission device to achieve a synchronous movement between the gyroscope and the imaging device in vertical direction, and thus achieving a stable imaging of the camera by virtue of the stability of the gyroscope.

In some embodiments, the carrier 500 may further comprise electronic speed regulation modules and casings. The number of the electronic speed regulation modules and the number of the casings may correspond to the number of motors. One motor and one corresponding electronic speed regulation module may be electrically connected and received in one casing.

In some embodiments, an electric slip ring is disposed between the motor of the transmission assembly and the frame, such that the frame may rotate 360° circumferentially about a corresponding rotational axis.

In some embodiments, an electric slip ring may be disposed between the first motor and the first frame, and an electric slip ring may be disposed between the second motor and the second frame, so that the first frame and second frame may rotate 360° circumferentially about corresponding rotational axes.

Taking aerial photography as an example, the carrier 500 in FIG. 5 may be fixed to the body of an unmanned aerial vehicle. The carrier 500 may comprise a frame assembly (i.e., the first frame 520 and the second frame 540), a motor assembly (i.e., the first motor 530 and the second motor 550), an imaging apparatus 510 and a control assembly. The control assembly may comprise a processor and an inertial sensor. The inertial sensor may detect an attitude information of the imaging apparatus 510. The processor may control the motor assembly based upon the attitude information. The motor assembly may directly drive the frame assembly to rotate, so as to adjust an imaging angle of the imaging apparatus 510. The first frame 520 and the second frame 540 may respectively rotate about a fixed axis (e.g., a rotational axis X and a rotational axis Y). In some embodiments, an angle formed by the rotational axis X and rotational axis Y may be a non-right angle.

Figure 6:
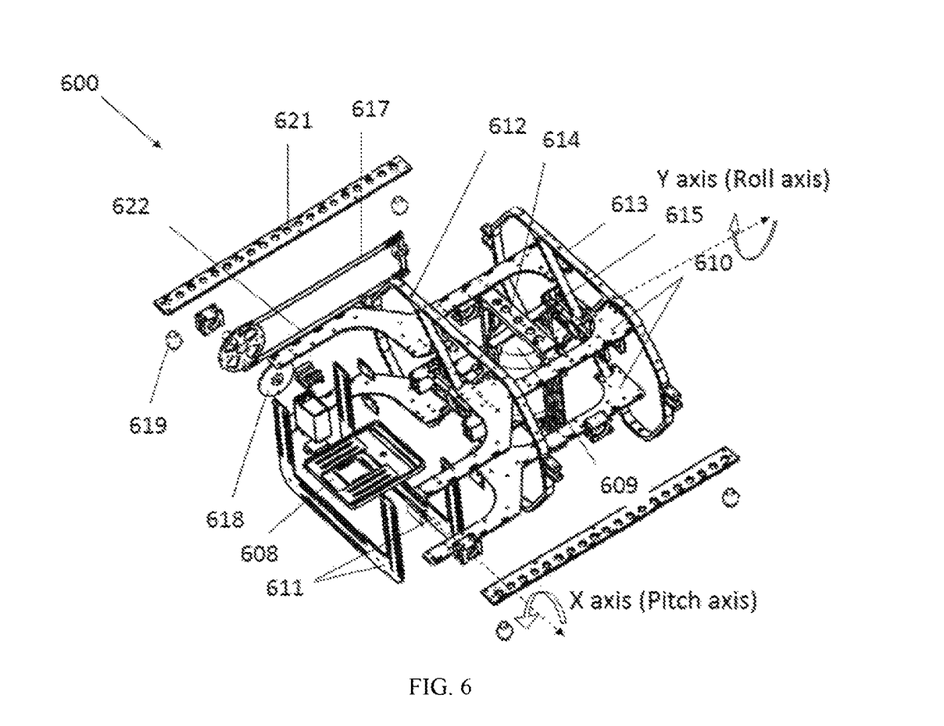
FIG. 6 is a diagram showing structure of another gyroscopic carrier.

FIG. 6 is a schematic view of another gyroscopic carrier 600. The carrier 600 may comprise a frame (also referred to as a stabilizing device), a transmission device and a carried object (e.g., an imaging device). The carried object may comprise a camera support 608 on which various models of cameras (not shown) may be fixed.

The stabilizing device may ensure an overall stability of the carrier 600 by virtue of a mechanical gyroscope which may remain stable upon high-speed rotating. A first mechanism frame 612 and a second mechanism frame 613 may be respectively mounted at a middle portion and a rear portion of the carrier 600. A bearing seat is mounted at the center of the first mechanism frame 612, and a bearing seat is mounted at the center of the second mechanism frame 613. The bearing seats may be coaxial. A horizontal rotating frame 610 may be connected with the first mechanism frame 612 and second mechanism frame 613 via the bearing seats, and the horizontal rotating frame 610 may rotate about the common axis.

The horizontal rotating frame 610 may comprise two parts, i.e., a rectangular frame and a U-shaped frame. The rectangular frame may be provided at an upper part. Two ends of the rectangular frame may be respectively mounted in the bearing seats of the first mechanism frame 612 and second mechanism frame 613. Therefore, the horizontal rotating frame 610 may swing in a left and right direction between the first mechanism frame 612 and second mechanism frame 613. The rectangular frame may be mounted with a cross connection mechanism and a mechanical gyroscope 609 therein. The cross connection mechanism may comprise an inner cross connection frame 615 and an outer cross connection frame 614. A bearing may be respectively mounted on two sides of the outer frame 614. The outer frame 614 may be connected to the horizontal rotating frame 610 via the bearings to ensure that the gyroscope 609 and the connection device as a whole have a degree of freedom in a forward and backward movement. The outer frame 614 may be provided with threaded holes through which a position of a center of gravity of the gyroscope 609 may be vertically adjusted upon mounting. When the aerial vehicle experiencing a lateral shaking, the gyroscope 609 may remain vertical due to the inertia effect. The horizontal rotating frame 610 may be connected with the mechanical gyroscope 609 and may remain perpendicular to the mechanical gyroscope 609. A movement of the gyroscope may be transferred to the camera support 608 via a transmission rod 617, so as to ensure the carried object (e.g., the camera) remaining horizontal in the left-right direction. A servo 618 may be controlled by a remote controller to actively adjust an orientation of the camera.

A damping rubber 619 may absorb the low-frequency vibration produced by the aerial vehicle during flight, and the high-frequency vibration may be filtered out by the mechanical gyroscope 609 to thereby obtain stable images.

In some embodiments of the present invention, the horizontal rotating frame 610 may be non-orthogonally connected to a U-shaped suspension frame 611, such that the gimbal can have a more compact structure, better rigidity and lighter weight. Therefore, the angle formed by the rotational axis X and rotational axis Y may be a non-right angle as compared to a conventional right angle.

In some embodiments, the non-orthogonal angle between the horizontal rotating frame 610 and the U-shaped suspension frame 611 may be greater than 0° but less than 90°. In some embodiments, the angle formed by the rotational axis X and rotational axis Y may be between 0° and 30°. In some other embodiments, the angle may be between 30° and 45°, e.g., 30° or 45°. In some other embodiments, the angle may be between 45° and 90°. In some embodiments, the angle may be between 90° and 180°.

Figure 7:
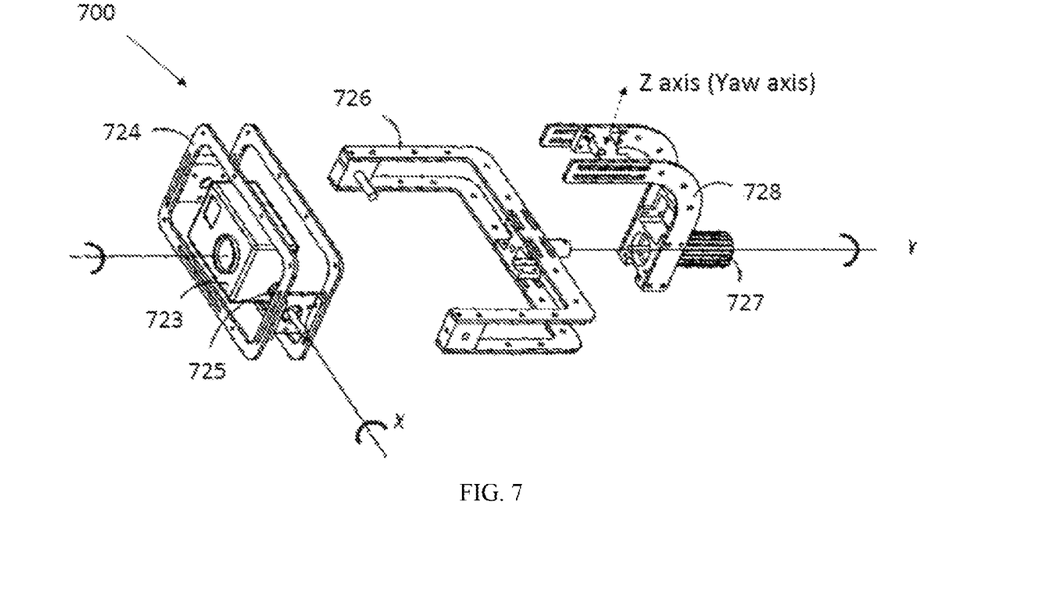
FIG. 7 is a diagram showing structure of a three-axis carrier.

FIG. 7 is a schematic view of a three-axis carrier 700. The carrier 700 may comprise a frame, a transmission device and a carried object (e.g., an imaging device) 723. The frame may comprise a first frame 724 and a second frame 726. The imaging device 723 may be fixed on the first frame 724. Here, the shape of the imaging device 723 may not be limited to a square shape as shown in FIG. 7, and it may be circular or other shapes as seen in the market. In order to enable the imaging device 723 to rotate about X axis (i.e., the rotational axis of the first frame 724), the first frame 724 may be rotatably disposed on the second frame 726 via a pin shaft at each end portion thereof. The structure can achieve an upward and a downward rotation of the imaging device 723.

In order to accommodate a left or right rolling flight of the unmanned aerial vehicle, the imaging device 723 may correspondingly perform a right or left rolling, thereby allowing a stable image or video to be captured. As shown in FIG. 7, the second frame 726 may rotate about its rotational axis Y. The second frame 726 may rotate leftward or rightward by a certain angle, so as to drive the first frame 724 and the imaging device 723 as a whole to rotate. In some embodiments, in order to drive the first frame 724 and second frame 726, motors 725 and 727 may be provided as power source. The merits of motor direct driving may include, for example, less energy consumption, power saving and environment-friendliness, short response time, and quick adjustment to adapt to various flight attitudes of the unmanned aerial vehicle. Therefore, an imaging stability of the imaging assembly may be improved. Furthermore, the motor can achieve an indefinitely variable adjustment and a smooth speed change to continuously and arbitrarily adjust the speed within an allowed range; therefore, the impact to mechanical members is smaller, and the stability is better. In some embodiments, as shown in FIG. 7, the transmission device may comprise a first motor 725 and a second motor 727. The first motor 725 may directly drive the first frame 724 to rotate about its rotational axis (i.e., X axis) with respect to the second frame 726. The second motor 727 may directly drive the second frame 726 to rotate about its rotational axis (i.e., Y axis).

At least one angle formed by two rotational axes among the rotational axis of the first frame 724, the rotational axis of the second frame 726 and the rotational axis of the third frame 728 (referred to as X axis, Y axis and Z axis, respectively) may be a non-right angle. For instance, the right angle in conventional designs may be changed into a non-right angle. This design of present invention may shorten a distance between motors of two non-orthogonal axes; therefore, the corresponding shaft arm may be shorter, leading to a more compact structure, better rigidity and the lighter weight of the carrier. Furthermore, the space for a rotation (i.e., the equivalent moment of inertia) of two axes of the gimbal, which intersect at a non-right angle, may be reduced, thereby reducing the loads applied on the motors of the corresponding axes.

In some embodiments, the non-orthogonal angle formed by the two rotational axes may be between 0° and 90°. In some embodiments, the angle formed by the rotational axis X and rotational axis Y may be between 0° and 30°. In some embodiments, the angle may be between 30° and 45°, e.g., 30° or 45°. In some embodiments, the angle may be between 45° and 90°. In some embodiments, the angle may be between 90° and 180°.

Figure 8:
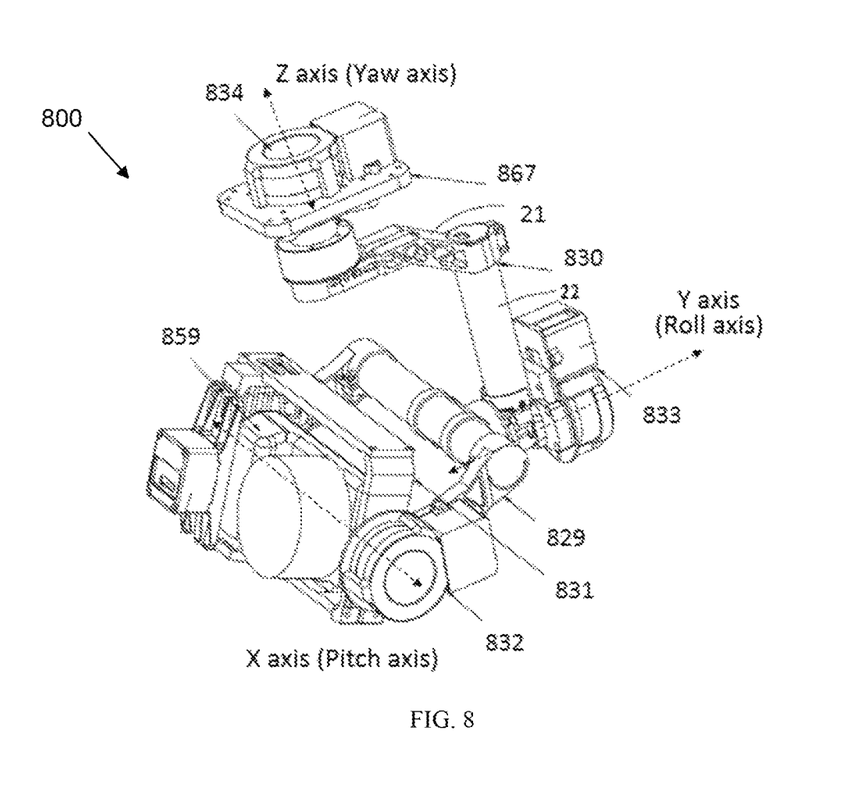
FIG. 8 is a diagram showing structure of another three-axis carrier.

FIG. 8 shows a carrier 800 that may rotate 360° circumferentially about three axes. The carrier 800 may comprise a first rotation member 829, a second rotation member 830, a first driving member 832, a second driving member 833, a third driving member 834 and a carrying member 831. The carrying member 831 may carry a carried object 859 such as an imaging device, a light source or a radar. In this embodiment, the advantageous effects of the present embodiment may be explained by employing a mirrorless interchangeable-lens camera (MILC) 859 as an imaging device and mounting the carrier 800 to an aerial vehicle. The MILC 859 may be fixed on the carrying member 831 via a locking member. Alternatively, it may be understood that the carrying member 831 may carry other types of cameras or surveillance cameras.

The carrier 800 may be used for a video capturing device, an image capturing device or a surveillance device, and may be employed in fields such as maimed or unmanned aerial vehicles, carrying bodies, automobiles, ships, robots, film capturing or handheld devices. The carrying member 831 may be rotatably connected to the first rotation member 829, and the first rotation member 829 may be rotatably connected to the second rotation member 830. The second rotation member 830 may comprise a lateral support arm 21 and a longitudinal support arm 22. The lateral support arm 21 and longitudinal support arm 22 may be fixedly connected to each other or may be formed integrally. The rotation direction of the carrying member 831 may be perpendicular to the rotation direction of the first rotation member 829. The carrier 800 may further comprise a fixing member 867 which may be fixedly locked to a mounting position of the aerial vehicle. The second rotation member 830 may be rotatably connected to the fixing member 867. The fixing member 867 may be provided with a third driving member 834 for driving the second rotation member 830 to rotate with respect to the fixing member 867, such that to a three-axis carrier 800 is provided.

The carrier 800 may further comprise the first driving member 832 for driving the carrying member 831 to rotate it with respect to the first rotation member 829, and the second driving member 833 for driving the first rotation member 829 to rotate it with respect to the second rotation member 830. The first driving member 832 may comprise a first motor, the second driving member 833 may comprise a second motor, and the third driving member 834 may comprises a third motor. An electric slip ring may be disposed between the fixing member 867 and the second rotation member 830, which may maintain an electrical conductivity when the second rotation member 830 rotates. The gimbal may unrestrictedly rotate 360° about three axes.

The use of a conductive slip ring in connecting electrical components of the carrier may solve a number of prior art problems in motor driving. For instance, cables directly connected to the electrical devices on the carrier may suffer from entanglement and restriction, so that the carrier cannot perform an omnidirectional rotation, and the electrical devices cannot achieve 360° omnidirectional rotation, which may restrict the functions of the carrier and being not user friendly.

The conductive slip ring may provide an electrical contact slip connection, and may also be referred to as an electrical rotary connector, collector ring, rotary joint, rotary electrical interface, slip ring, current collector ring, return circuit ring, coil, commutator, or adaptor, which is a precise power transmission device for achieving transmission of images, data signals and power between two mechanisms that rotate with respect to each other. The slip ring may be particularly suitable for situations in which transmission of power or data from a fixed position to a rotating position is required during unrestricted continuous rotation. In some embodiments, the electric slip ring may comprise a slip ring rotor and a slip ring stator. The slip ring rotor and slip ring stator may be respectively fixed to two frames of the carrier that rotate with respect to each other, or respectively fixed to the carried object and the frame about which the carried object rotates. A carrier capable of performing a 360° rotation by employing the electric slip ring may further improve the stability of aerial photography on a flying object.

The rotational axis of the carrying member 831 about the first rotation member 829 and the rotational axis of the first rotation member 829 about the second rotation member 830 may be referred to as X axis and Y axis, respectively. The rotational axis of the second rotation member 830 about the fixing member 867 may be referred to as Z axis. According to some embodiments of the present invention, at least one angle formed by two axes of the X axis, Y axis and Z axis may be a non-right angle. The configuration may enable the driving members (i.e., motors) of two axes, which are intersecting at a non-right angle, closer to each other, resulting in a shorter shaft arm, a more compact structure, an improved rigidity and a lighter weight. Furthermore, a space (i.e., the equivalent moment of inertia) for a rotation about two axes of the gimbal, which intersect at a non-right angle, may be reduced, thereby reducing the load applied on the driving member (i.e., motor) of the corresponding axis.

In some embodiments, the non-orthogonal angle formed by the two rotational axes may be greater than 0° but less than 90°. In some embodiments, the angle formed by the rotational axis Z and rotational axis Y may be between 0° and 90°. In some embodiments, the angle may be between 60° and 70°, 60° or 70°. In some embodiments, the angle may be between 45° and 90°. In some embodiments, the angle may be between 90° and 180°.

Figure 9A:
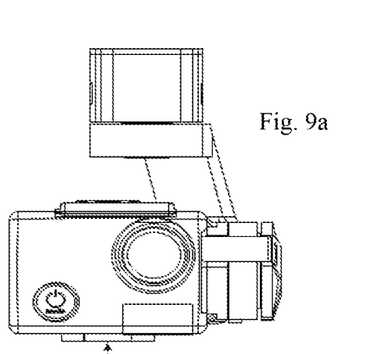
FIGS. 9a-c are perspective view of a carrier having its roll-axis and pitch-axis being non-orthogonal to each other.
Figure 9B:
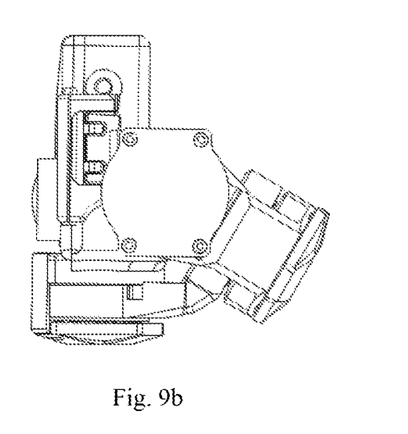
Figure 9C:
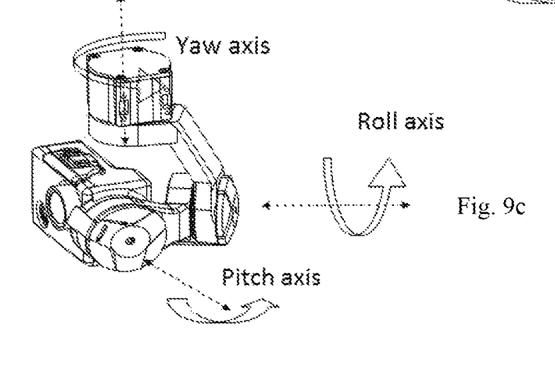

FIGS. 9a-c are perspective views of a carrier with non-orthogonal roll axis and pitch axis. FIG. 9a is a front view, FIG. 9b is a bottom view, and FIG. 9c is a perspective view. The moment of inertia of the load on roll axis may be similarly reduced, as discussed hereinabove. Similar to the situation of the non-orthogonal yaw axis and roll axis shown in FIG. 2, the moment of inertia of the load on roll axis may be reduced.

Figure 10A:
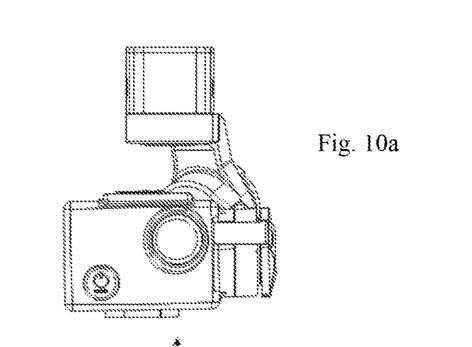
FIGS. 10a-c are perspective views of a carrier having every two adjacent axes among three axes being non-orthogonal to each other.
Figure 10B:
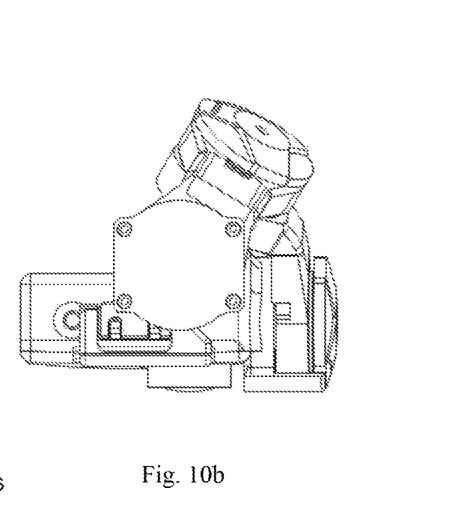
Figure 10C:
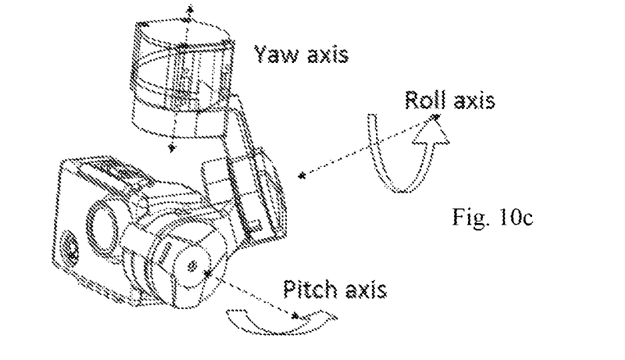

FIGS. 10a-c are perspective view of a carrier of which every two adjacent axes among its three axes are non-orthogonal. FIG. 10a is a front view, FIG. 10b is a bottom view, and FIG. 10c is a perspective view.

In the embodiments as discussed hereinabove, the center of gravity of a load applied on each axis may substantially coincide with a corresponding axis, so as to achieve a balanced control during the actuation of the carrier. A deviation in the position of the center of gravity of the load may be permitted within a design range.

The foregoing disclosure is only preferred embodiments of the present invention, and the protection scope of the present invention is not limited to the above embodiments. Those equivalent modifications or variations made by those having ordinary skill in the art according to the disclosure of the present invention all fall within the protection scope as recited in the claims.

What is claimed is:

1. A carrier for a movable object, the carrier being configured to couple a carried object to the movable object, said carrier comprising:
    at least two rotational axes;
    wherein a combined rotation about the at least two rotational axes controls an orientation of the carried object or compensates a movement and a vibration of the movable object to stabilize the carried object;
    wherein an angle formed by the two rotational axes is a non-right angle to reduce a rotation radius of the rotation, so as to reduce an equivalent moment of inertia; and
    wherein a center of gravity of a load applied on each axis of the two rotational axes coincides with a corresponding axis.

2. The carrier according to claim 1, wherein:
    the carrier with the at least two rotational axes comprises three rotational axes;
    a combined rotation about the three rotational axes controls the orientation of the carried object or compensates the movement and vibration of the movable object to stabilize the carried object;
    at least one angle formed by two axes among the three rotational axes is a non-right angle; and
    a center of gravity of a load applied on each axis of the three rotational axes coincides with a corresponding axis.

3. The carrier according to claim 1, wherein the non-right angle is greater than 0° but less than 90°.

4. The carrier according to claim 3, wherein the non-right angle is between 60° and 70°.

5. The carrier according to claim 4, wherein the non-right angle is about 70°.

6. The carrier according to claim 1, wherein the non-right angle is formed by bending a lateral shaft arm towards a plane.

7. The carrier according to claim 1, further comprising a frame assembly, a transmission assembly and a carried object assembly, wherein the frame assembly comprises a first frame, a second frame and a third frame.

8. The carrier according to claim 7, wherein:
    the carrier is a dynamic self-balancing gyroscopic carrier; and
    the carrier further comprises a control assembly, the control assembly including an inertial sensor for detecting an attitude information of the carried object and a processor for controlling the attitude of the carried object based upon the attitude information.

9. The carrier according to claim 8, wherein:
    the transmission assembly further comprises a motor assembly controlled by the processor based upon the attitude information; and
    the motor assembly directly drives the frame assembly to rotate the frame assembly with respect to the carried object so as to adjust the attitude of the carried object.

10. The carrier according to claim 8, further comprising a horizontal rotating frame connected to the first frame and second frame, wherein:
    the horizontal rotating frame is mounted therein with a cross connection mechanism and a mechanical gyroscope; and
    the transmission assembly comprises a first motor directly driving the first frame to rotate the first frame with respect to the second frame, and a second motor directly driving the linkage member to thereby drive the second frame to rotate with respect to the third frame.

* * * * *